(12) United States Patent
Byrne et al.

(10) Patent No.: US 10,988,940 B2
(45) Date of Patent: Apr. 27, 2021

(54) SURFACE-MOUNTED RESONATORS FOR WIRELESS POWER

(71) Applicants: Norman R. Byrne, Ada, MI (US);
Peter J. Maher, Grand Rapids, MI (US); Timothy J. Warwick, Sparta, MI (US); Gerald N. Vander Till, Grandville, MI (US); Nickolas J. Morrow, Ada, MI (US)

(72) Inventors: Norman R. Byrne, Ada, MI (US);
Peter J. Maher, Grand Rapids, MI (US); Timothy J. Warwick, Sparta, MI (US); Gerald N. Vander Till, Grandville, MI (US); Nickolas J. Morrow, Ada, MI (US)

(*) Notice: Subject to any disclaimer, the term of this patent is extended or adjusted under 35 U.S.C. 154(b) by 921 days.

(21) Appl. No.: 15/612,605

(22) Filed: Jun. 2, 2017

(65) Prior Publication Data

US 2017/0350136 A1 Dec. 7, 2017

Related U.S. Application Data

(60) Provisional application No. 62/345,415, filed on Jun. 3, 2016.

(51) Int. Cl.
| | | |
|---|---|---|
| *E04F 15/024* | (2006.01) | |
| *H02J 50/05* | (2016.01) | |
| *E04F 15/18* | (2006.01) | |
| *E04F 15/04* | (2006.01) | |

(52) U.S. Cl.
CPC ........ *E04F 15/02405* (2013.01); *E04F 15/18* (2013.01); *H02J 50/05* (2016.02); *E04F 15/04* (2013.01); *E04F 2290/02* (2013.01)

(58) Field of Classification Search
None
See application file for complete search history.

(56) References Cited

U.S. PATENT DOCUMENTS

| | | |
|---|---|---|
| 4,372,629 A | 2/1983 | Propst et al. |
| 4,551,577 A | 11/1985 | Byrne |
| 4,747,788 A | 5/1988 | Byrne |
| 4,984,982 A | 1/1991 | Brownlie et al. |
| 5,171,159 A | 12/1992 | Byrne |

(Continued)

FOREIGN PATENT DOCUMENTS

| | | |
|---|---|---|
| CN | 202552802 | 11/2012 |
| WO | 2013/112185 | 8/2013 |

*Primary Examiner* — Jared Fureman
*Assistant Examiner* — Joel Barnett
(74) *Attorney, Agent, or Firm* — Gardner, Linn, Burkhart & Ondersma LLP

(57) ABSTRACT

A wireless electrical power transmission system includes a panel having a recessed area for receiving a wireless power transmitter, such as an electric field resonant transmitter. The panel has a first outer surface and a second outer surface opposite the first outer surface, with a thickness defined between the first and second outer surfaces. The recessed area is formed in the first outer surface, and the recessed area has a depth that is less than the thickness of the panel. Electrical wiring is coupled to the wireless power transmitter and passes through an opening formed in the panel, which opening is accessible from the recessed area, and the electrical wiring is in communication with an electrical power source.

18 Claims, 6 Drawing Sheets

(56) References Cited

U.S. PATENT DOCUMENTS

| | | |
|---|---|---|
| 5,575,668 A | 11/1996 | Timmerman |
| 5,709,156 A | 1/1998 | Gavaert et al. |
| 5,959,433 A | 9/1999 | Rohde |
| 5,980,279 A | 11/1999 | Muller |
| 6,028,267 A | 2/2000 | Byrne |
| 6,028,413 A | 2/2000 | Brockmann |
| 6,036,516 A | 3/2000 | Byrne |
| 6,046,405 A | 4/2000 | Obermann |
| 6,290,518 B1 | 9/2001 | Byrne |
| 6,379,182 B1 | 4/2002 | Byrne |
| 6,436,299 B1 | 8/2002 | Baarman et al. |
| 6,756,697 B2 | 6/2004 | Mizutani et al. |
| 6,803,744 B1 | 10/2004 | Sabo |
| 6,967,462 B1 | 11/2005 | Landis |
| 6,979,209 B2 | 12/2005 | Griepentrog |
| 7,183,504 B2 | 2/2007 | Byrne |
| 7,212,414 B2 | 5/2007 | Baarman |
| 7,222,031 B2 | 5/2007 | Heatley |
| 7,233,222 B2 | 6/2007 | Baarman et al. |
| 7,262,700 B2 | 8/2007 | Hsu |
| 7,355,150 B2 | 4/2008 | Baarman et al. |
| 7,392,068 B2 | 6/2008 | Dayan et al. |
| 7,399,202 B2 | 7/2008 | Dayan et al. |
| 7,443,057 B2 | 10/2008 | Nunally |
| 7,465,178 B2 | 12/2008 | Byrne |
| 7,633,263 B2 | 12/2009 | Toya |
| 7,674,119 B1 | 3/2010 | McCarthy |
| 7,736,178 B2 | 6/2010 | Byrne |
| 7,863,861 B2 | 1/2011 | Cheng et al. |
| 7,878,845 B2 | 2/2011 | Byrne |
| 7,887,113 B2 | 2/2011 | Lambarth et al. |
| D639,244 S | 6/2011 | Byrne |
| 8,061,864 B2 | 11/2011 | Metcalf et al. |
| 8,106,539 B2 | 1/2012 | Schatz et al. |
| 8,262,244 B2 | 9/2012 | Metcalf et al. |
| 8,283,812 B2 | 10/2012 | Azancot et al. |
| 8,287,292 B2 | 10/2012 | Byrne |
| 8,295,036 B2 | 10/2012 | Byrne |
| 8,395,353 B2 | 3/2013 | Wang et al. |
| 8,398,408 B1 | 3/2013 | Hansen et al. |
| 8,421,407 B2 | 4/2013 | Johnson |
| 8,444,432 B2 | 5/2013 | Byrne et al. |
| 8,456,038 B2 | 6/2013 | Azancot et al. |
| 8,480,429 B2 | 7/2013 | Byrne |
| 8,482,160 B2 | 7/2013 | Johnson et al. |
| 8,487,478 B2 | 7/2013 | Kirby et al. |
| 8,497,601 B2 | 7/2013 | Hall et al. |
| 8,558,661 B2 | 10/2013 | Zeine |
| 8,559,172 B2 | 10/2013 | Byrne |
| 8,581,444 B2 | 11/2013 | Urano |
| 8,616,921 B2 | 12/2013 | Byrne et al. |
| 8,618,695 B2 | 12/2013 | Azancot et al. |
| 8,624,750 B2 | 1/2014 | Azancot |
| 8,690,590 B2 | 4/2014 | Byrne |
| 8,721,124 B2 | 5/2014 | Byrne et al. |
| 8,937,407 B2 | 1/2015 | Byrne et al. |
| 8,944,266 B2 | 2/2015 | Roemer et al. |
| 8,951,054 B2 | 2/2015 | Byrne et al. |
| 9,148,006 B2 | 9/2015 | Byrne et al. |
| 9,312,673 B2 | 4/2016 | Byrne et al. |
| 9,438,070 B2 | 9/2016 | Byrne et al. |
| 9,484,751 B2 | 11/2016 | Byrne et al. |
| 9,605,455 B2 | 5/2017 | Byrne et al. |
| 9,653,948 B2 | 5/2017 | Polu et al. |
| 9,979,206 B2 | 5/2018 | Nyberg et al. |
| 10,033,225 B2 | 7/2018 | Polu et al. |
| 10,050,473 B2 | 9/2018 | Byrne et al. |
| 10,116,094 B2 | 10/2018 | Byrne et al. |
| 10,424,942 B2 | 9/2019 | Nyberg et al. |
| 2002/0171335 A1 | 11/2002 | Held |
| 2003/0048254 A1 | 3/2003 | Huang |
| 2003/0202317 A1 | 10/2003 | Jans |
| 2004/0026998 A1 | 2/2004 | Henriott et al. |
| 2004/0150934 A1 | 8/2004 | Baarman |
| 2004/0189246 A1 | 9/2004 | Bulai et al. |
| 2005/0068019 A1 | 3/2005 | Nakamura |
| 2007/0182367 A1 | 8/2007 | Partovi |
| 2007/0279002 A1 | 12/2007 | Partovi |
| 2008/0001572 A9 | 1/2008 | Baarman et al. |
| 2008/0079392 A1 | 4/2008 | Baarman et al. |
| 2008/0121147 A1 | 5/2008 | Cooke et al. |
| 2008/0166965 A1 | 7/2008 | Greene et al. |
| 2008/0169910 A1 | 7/2008 | Greene et al. |
| 2008/0200050 A1 | 8/2008 | Byrne |
| 2009/0045772 A1 | 2/2009 | Cook et al. |
| 2009/0096413 A1 | 4/2009 | Partovi et al. |
| 2009/0212636 A1 | 8/2009 | Cook et al. |
| 2009/0212638 A1 | 8/2009 | Johnson |
| 2009/0230777 A1 | 9/2009 | Baarman et al. |
| 2009/0271048 A1 | 10/2009 | Wakamatsu |
| 2009/0278494 A1 | 11/2009 | Randall |
| 2010/0007307 A1 | 1/2010 | Baarman et al. |
| 2010/0038970 A1 | 2/2010 | Cook et al. |
| 2010/0052431 A1 | 3/2010 | Mita |
| 2010/0127660 A1 | 5/2010 | Cook et al. |
| 2010/0187913 A1 | 7/2010 | Smith et al. |
| 2010/0201201 A1 | 8/2010 | Mobarhan et al. |
| 2010/0244584 A1 | 9/2010 | Azancot et al. |
| 2010/0259401 A1 | 10/2010 | Azancot et al. |
| 2010/0290215 A1 | 11/2010 | Metcalf et al. |
| 2010/0308665 A1 | 12/2010 | Itkonen |
| 2010/0321939 A1 | 12/2010 | Patel |
| 2011/0006611 A1* | 1/2011 | Baarman ............... H02J 50/40 307/104 |
| 2011/0062789 A1 | 3/2011 | Johnson et al. |
| 2011/0121660 A1 | 5/2011 | Azancot et al. |
| 2011/0175544 A1 | 7/2011 | Jong |
| 2011/0193417 A1 | 8/2011 | Hirasaka et al. |
| 2011/0241607 A1 | 10/2011 | Wiegers |
| 2011/0241614 A1 | 10/2011 | Yeh |
| 2011/0248575 A1 | 10/2011 | Kim et al. |
| 2011/0260548 A1 | 10/2011 | Urano |
| 2011/0305056 A1 | 12/2011 | Chien |
| 2012/0113576 A1 | 5/2012 | Cooper et al. |
| 2012/0113645 A1 | 5/2012 | Liao et al. |
| 2012/0117730 A1 | 5/2012 | Lemire et al. |
| 2012/0153731 A9 | 6/2012 | Kirby et al. |
| 2012/0170292 A1 | 7/2012 | Bhosale et al. |
| 2012/0206097 A1 | 8/2012 | Soar |
| 2012/0228953 A1 | 9/2012 | Kesler et al. |
| 2012/0235474 A1 | 9/2012 | Mannino et al. |
| 2012/0261998 A1 | 10/2012 | Sato |
| 2012/0299539 A1 | 11/2012 | Jones et al. |
| 2012/0312196 A1 | 12/2012 | Newkirk |
| 2013/0049482 A1 | 2/2013 | Rofe et al. |
| 2013/0057203 A1 | 3/2013 | Jones et al. |
| 2013/0062964 A1 | 3/2013 | Chernakalov et al. |
| 2013/0062965 A1 | 3/2013 | Chernakalov et al. |
| 2013/0119777 A1* | 5/2013 | Rees ................. H01F 38/14 307/104 |
| 2013/0141038 A1 | 6/2013 | Papa |
| 2013/0175986 A1 | 7/2013 | Senatori |
| 2013/0200717 A1 | 8/2013 | Bourilkov et al. |
| 2013/0207478 A1 | 8/2013 | Metcalf et al. |
| 2013/0234481 A1 | 9/2013 | Johnson |
| 2013/0285606 A1 | 10/2013 | Ben-Shalom et al. |
| 2014/0021798 A1* | 1/2014 | Kesler ................ H01F 38/14 307/104 |
| 2014/0197755 A1* | 7/2014 | Willemsen ........... E04B 9/045 315/227 R |
| 2014/0361633 A1 | 12/2014 | Abe |
| 2015/0048687 A1* | 2/2015 | Wang ................. H02J 5/005 307/104 |
| 2015/0091389 A1* | 4/2015 | Byrne ................. H02J 5/005 307/104 |
| 2015/0249343 A1 | 9/2015 | Makwinski et al. |
| 2016/0022030 A1 | 1/2016 | Scott et al. |
| 2016/0025316 A1 | 1/2016 | Chien |
| 2016/0153650 A1 | 6/2016 | Chien |
| 2016/0233711 A1 | 8/2016 | Miller et al. |
| 2017/0085130 A1* | 3/2017 | Von Novak, III ...... H02J 50/05 |
| 2017/0156490 A1 | 6/2017 | Newhouse et al. |
| 2017/0177031 A1 | 6/2017 | Lesizza et al. |
| 2017/0224103 A1 | 8/2017 | Newhouse et al. |

(56) References Cited

U.S. PATENT DOCUMENTS

| | | |
|---|---|---|
| 2017/0237295 A1* | 8/2017 | Yuasa ................ H01F 27/04 307/104 |
| 2017/0258246 A1 | 9/2017 | Schwalbach et al. |
| 2017/0317458 A1 | 11/2017 | Byrne et al. |
| 2017/0317533 A1 | 11/2017 | Byrne et al. |
| 2018/0191178 A1 | 7/2018 | Byrne et al. |
| 2019/0140480 A1 | 5/2019 | Rouse |
| 2019/0165612 A1 | 5/2019 | Polu et al. |

* cited by examiner

SURFACE-MOUNTED RESONATORS FOR WIRELESS POWER

CROSS REFERENCE TO RELATED APPLICATION

The present application claims the filing benefits of U.S. provisional application Ser. No. 62/345,415, filed Jun. 3, 2016, which is hereby incorporated by reference herein in its entirety.

FIELD OF THE INVENTION

The present invention relates to wireless electrical power transmission and, more particularly, to mounting systems for resonators associated with electric field resonant capacitive coupling technologies and the like.

BACKGROUND OF THE INVENTION

Electric field ('E-field') wireless power systems cannot transmit electrical energy through ferrous materials, such as steel plates, panels, or tiles that are commonly used in raised floor systems, cannot penetrate steel wall studs, certain types of interior wall or divider panels, and the like. Therefore, ferrous materials are generally considered incompatible with E-field wireless power transmitters and receivers. Examples of E-field wireless power transmitters and receivers are described in U.S. patent application, Publication No. 2013/0147427, which corresponds to U.S. Pat. No. 9,653,948.

SUMMARY OF THE INVENTION

The present invention provides a wireless electrical power transmission system that places one or more wireless electrical power transmitters in areas where shielding or blocking by ferrous metals can be avoided. The system includes a panel having a recessed area for receiving a wireless power transmitter, such as an electric field resonant transmitter. The panel has a first outer surface and a second outer surface opposite the first outer surface, with a thickness defined between the first and second outer surfaces. The recessed area is formed in the first outer surface, and the recessed area has a depth that is less than the thickness of the panel. Electrical wiring is coupled to the wireless power transmitter and passes through an opening formed in the panel, which opening is accessible from the recessed area, and the electrical wiring is in communication with an electrical power source. The system may be incorporated into floor structures, including raised flooring systems, or into walls, ceilings, or work surfaces such as tables or desks. Because substantially any non-ferrous aesthetic covering may be used, the system can be incorporated into these various areas without any adverse visual impact, and without compromising a desired level of durability for the area in which it is placed.

In one form of the present invention, a wireless electrical power transmission system includes a panel with first and second outer surfaces, a recessed area formed in the first outer surface, a wireless power transmitter in the recessed area, and electrical wiring. The panel's second outer surface is located opposite the first outer surface, and the panel has a thickness defined between the first and second outer surfaces. The recessed area has a depth that is less than the panel thickness. The electrical wiring is coupled to the wireless power transmitter and passes through an opening formed in the panel, the opening being accessible from the recessed area, and the electrical wiring is in communication with an electrical power source.

In one aspect, the panel is made at least partly of ferrous material.

In another aspect, the panel is made at least partly of a ceramic or composite concrete material.

In yet another aspect, the recessed area is circular, square, or rectangular in shape. Optionally, the recessed area includes at least two concentric circles or at least two squares having a common center. The recessed area may include a recessed pass-through disposed between the at least two concentric circles or between the at least two squares.

In a further aspect, the opening formed in the panel is a bore located in the recessed pass-through and extending through the second outer surface.

In still another aspect, the panel is a structural floor panel of a raised floor system. Optionally, the panel is supported by a structural framework that cooperates with the panel to define a hollow chamber below the panel.

In a still further aspect, the wireless electrical power transmission system further includes a power driver circuit positioned in the hollow chamber and in electrical communication with the wiring and the electrical power source. The power driver circuit is operable to receive high voltage AC power from the electrical power source and to convert the high voltage AC power to a voltage and type for use by the wireless power transmitter.

Optionally, the wireless power transmitter is an electric field transmitter operable to establish an electric field resonant capacitive coupling with an electric field receiver spaced from the first outer surface.

In another aspect, the wireless electrical power transmission system further includes an aesthetic cover positioned along the first outer surface of the panel and the wireless power transmitter. Optionally, an adhesive layer is provided for adhering the aesthetic cover to at least the first outer surface of the panel.

Accordingly, the wireless electrical power transmission system of the present invention provides an arrangement in which wireless electrical power transmitters can be used in combination with ferrous metals, such as in structural panels of raised floor applications. Other components of the system, such as a power driver circuit, may be positioned remotely from the transmitter and connected via wiring that passes through the panel. The system may include an aesthetic panel of predominantly non-ferrous material, thus presenting a suitable aesthetic appearance. This allows for electrical power transmission to electrical systems associated with furniture articles, to rechargeable portable power supplies or other electrical power consumers having compatible wireless electrical power receivers.

These and other objects, advantages, purposes and features of the present invention will become apparent upon review of the following specification in conjunction with the drawings.

DESCRIPTION OF THE PREFERRED EMBODIMENTS

Figure 1:
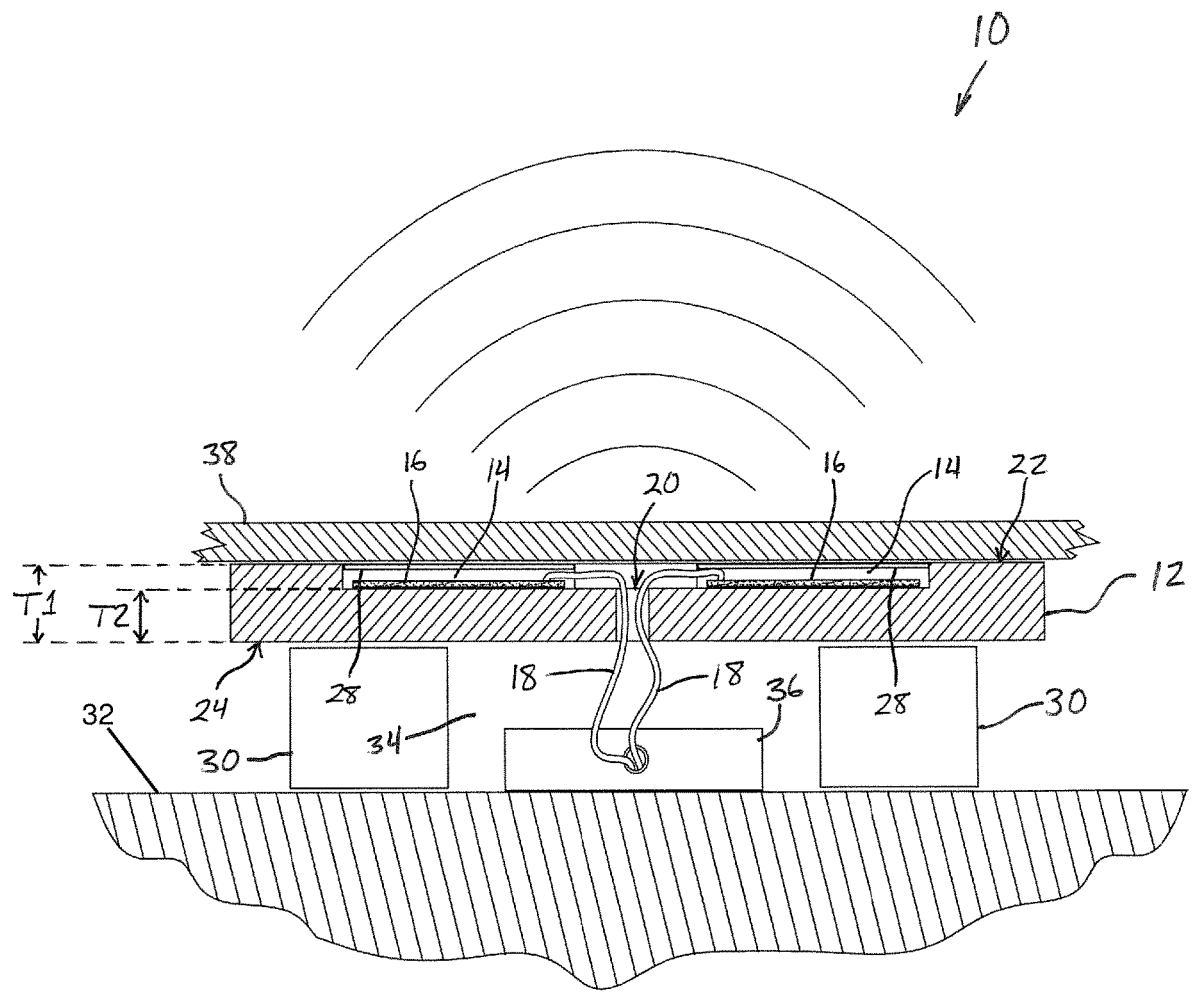
FIG. 1 is a side sectional elevation, taken along section line I-I of FIG. 4, of a portion of a raised floor system incorporating surface-mounted resonators for wireless electrical power transmission in accordance with the present invention.
Figure 2:
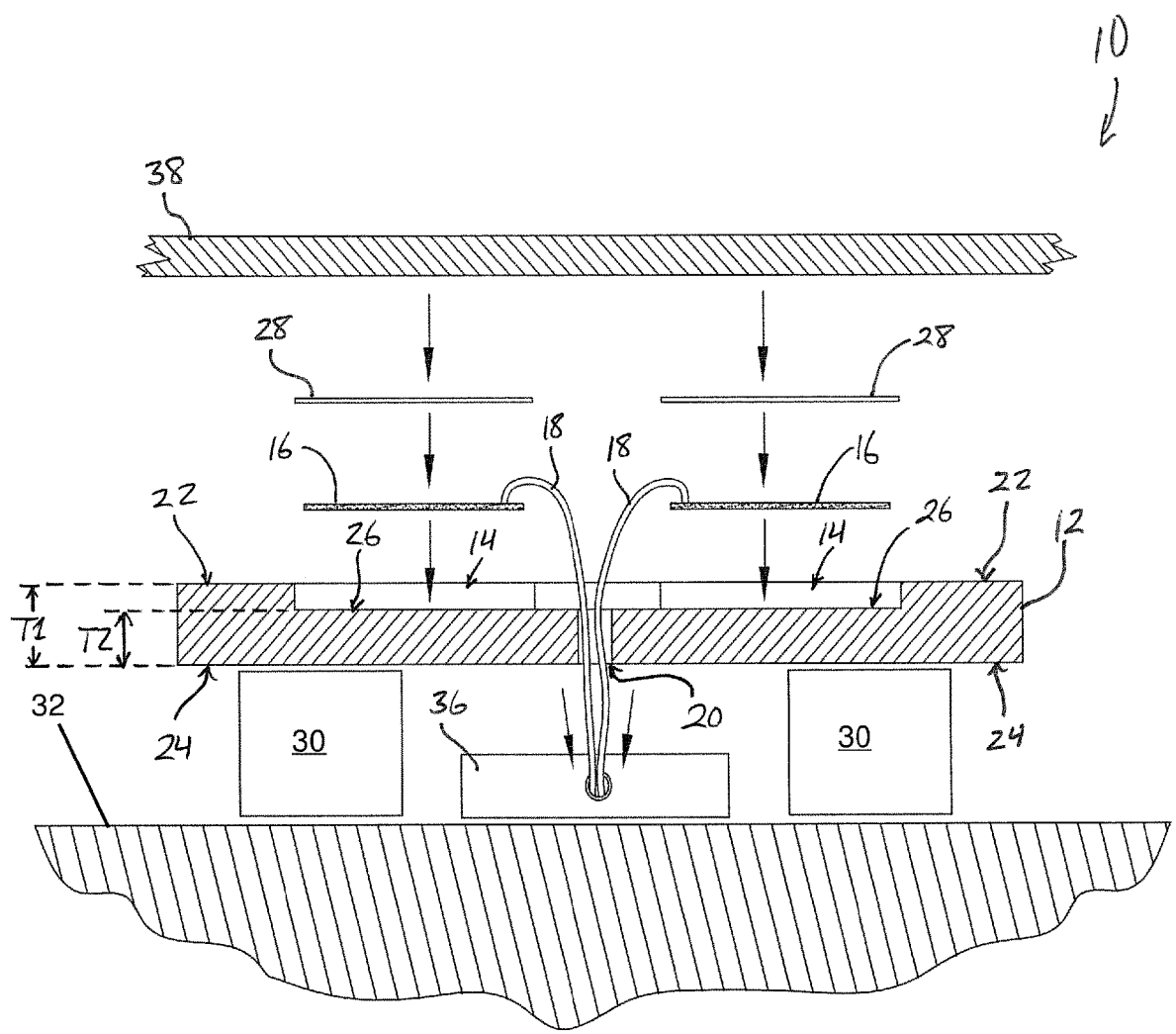
FIG. 2 is an exploded side sectional elevation of the raised floor system and surface-mounted resonators of FIG. 1.

Referring now to the drawings and the illustrative embodiments depicted therein, a wireless electrical power transmission system 10 includes a panel 12 defining one or more recessed areas 14, such as shown in FIGS. 1 and 2. Wireless power transmitters or resonators 16 are positioned in respective recessed areas 14, and are electrically coupled to wiring 18 that passes through an opening or bore 20 formed in panel 12. Panel 12 has a first outer surface 22 and a second outer surface 24 located opposite the first outer surface 22, and has a first thickness T1 defined between the first and second outer surfaces 22, 24, and a second thickness T2 defined between base surfaces 26 of recessed areas 14 (FIGS. 2, 3, 5 and 7) and second outer surface 24. The thickness of wireless power transmitters 16 may be equal to the depth of recessed areas 14 (which depth may be calculated as second thickness T2 subtracted from first thickness T1), or may be less than the depth of recessed areas 14, as shown. Where the thickness of wireless power transmitters 16 is less than the depth of recessed areas 14, the remaining space above power transmitters 16 may be at least partially filled by protective panels or sheets 28 (FIG. 2), thereby reducing the risk of damage to transmitters 16, such as may be caused by dropped objects, heavy furniture or rolling carts, and the like, particularly in flooring applications.

In the illustrated embodiment, panel 12 is a structural substrate that forms the upper structural layer of a raised flooring system, which includes structural support elements or spacers 30 that may form part of a framework resting on a substantially solid base surface 32. For example, it is envisioned that panel 12 and the associated wireless electrical power transmission system 10 may be adapted for use in raised floor systems like those described in commonly-owned U.S. Pat. Nos. 7,878,845 and 7,183,504, which are both hereby incorporated herein by reference in their entireties. Panel 12 may be manufactured by various materials, including ferrous metal, non-ferrous metal such as aluminum, wood or composite wood products (including medium density fiberboard or 'MDF'), ceramic, concrete or composite concrete products (including concrete mixed with fibrous materials), and the like.

Figure 3:
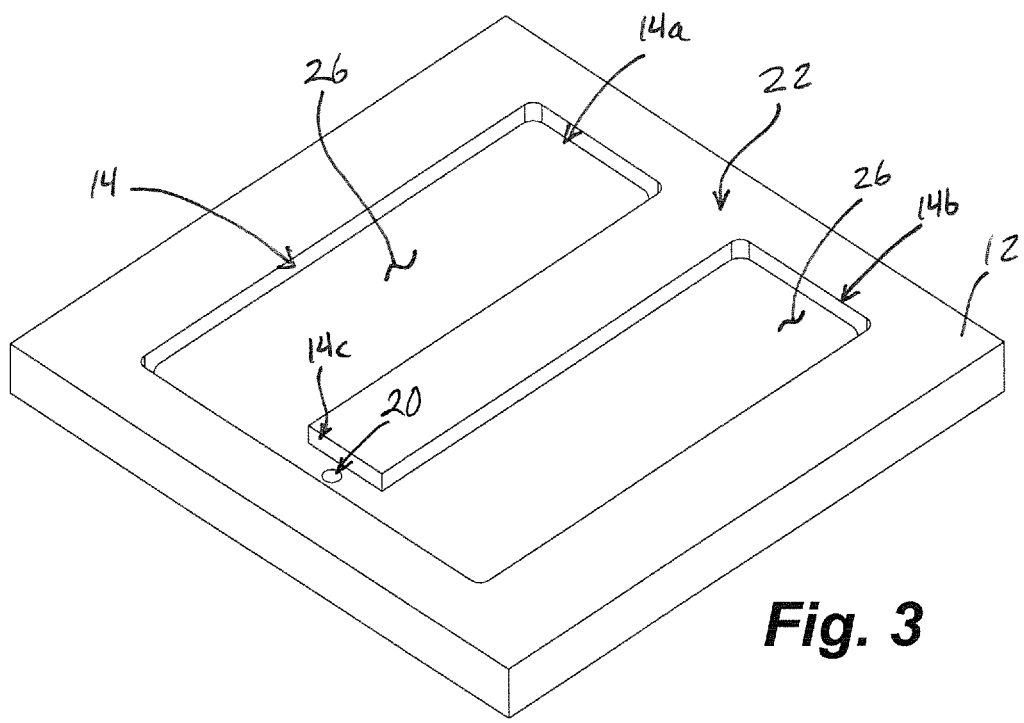
FIG. 3 is a perspective view of a substrate panel including rectangular recessed regions for receiving surface-mounted resonators for wireless electrical power transmission.
Figure 4:
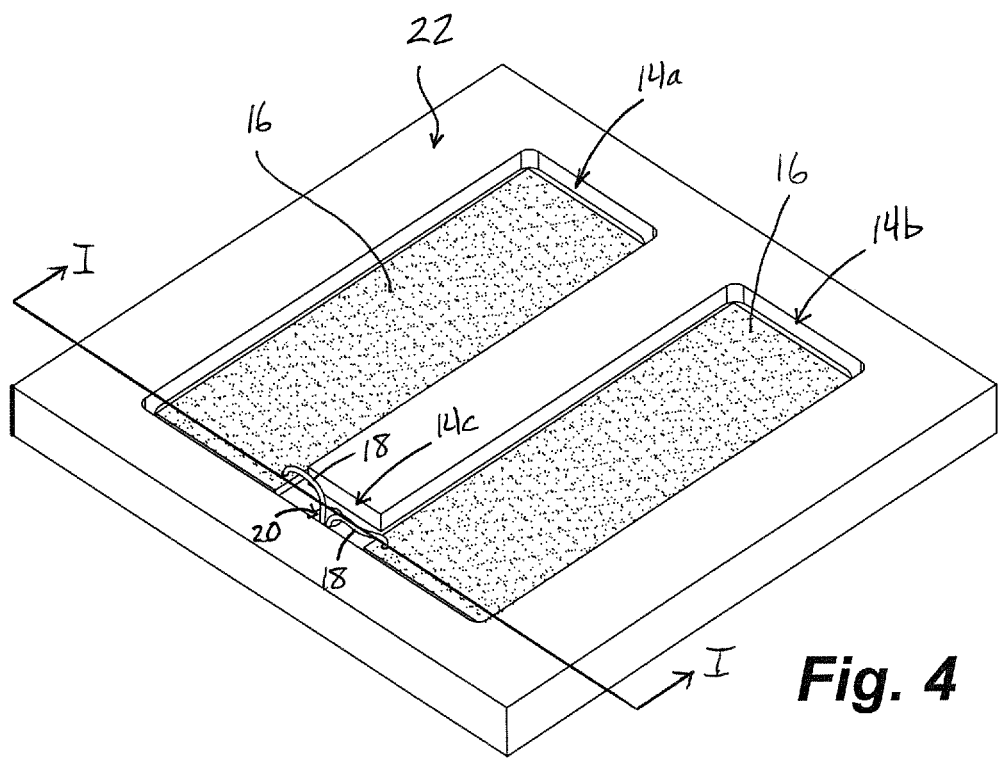
FIG. 4 is another perspective view of the substrate panel of FIG. 3, shown with E-field resonators mounted in the recessed regions of the panel.

Recessed areas 14 may be molded directly into panel 12 during manufacturing, or may be formed or established in panel 12 after manufacturing, such as using a stamping or milling process. In the embodiment of FIGS. 1-4, recessed area 14 is formed as two generally rectangular recessed areas 14a, 14b that are joined at their respective bases by an intermediate recessed area or pass-through 14c that forms a bight region of the overall U-shaped recessed area 14, as best shown in FIGS. 3 and 4. Wire opening 20 extends through base surface 26 at intermediate recessed area 14c, and through second outer surface 24, so that wiring 18 can pass through panel 12 and into a chamber 34 that is partially bounded by second outer surface 24, such as shown in FIGS. 1 and 2. However, it is further envisioned that an alternative wire opening or bore could be arranged through the panel to exit somewhere other than through the second outer surface 24, such as through a side edge of the panel or even though another location along the first outer surface 22 or base surface 26.

Figure 5:
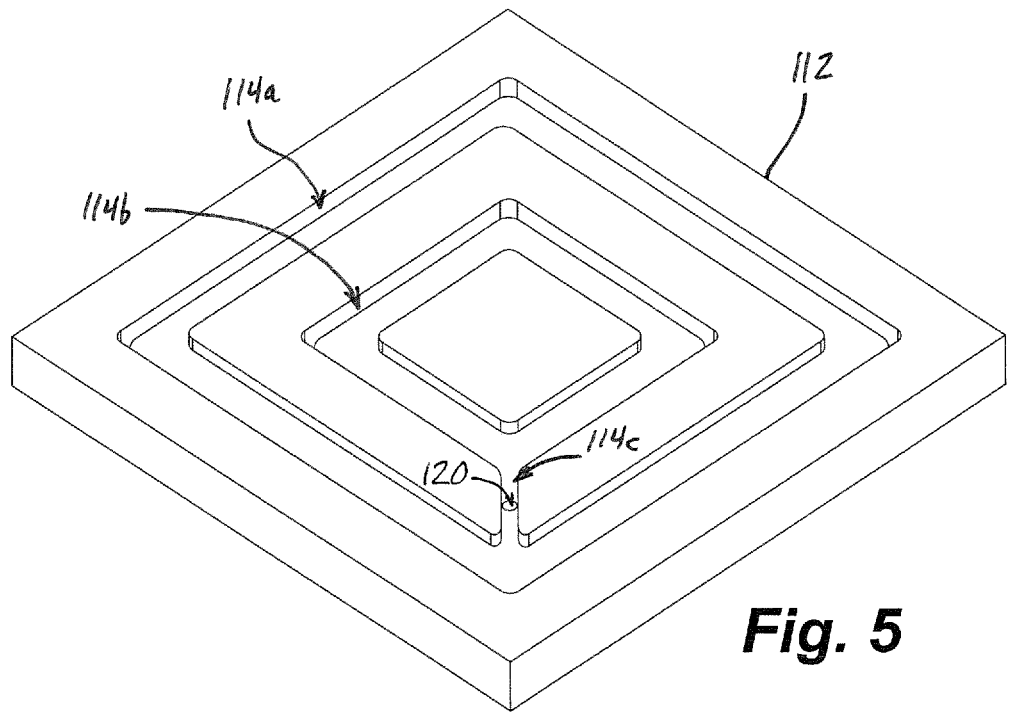
FIG. 5 is a perspective view of a substrate panel including two recessed regions in the shapes of squares having common centers, for receiving surface-mounted resonators for wireless electrical power transmission.
Figure 6:
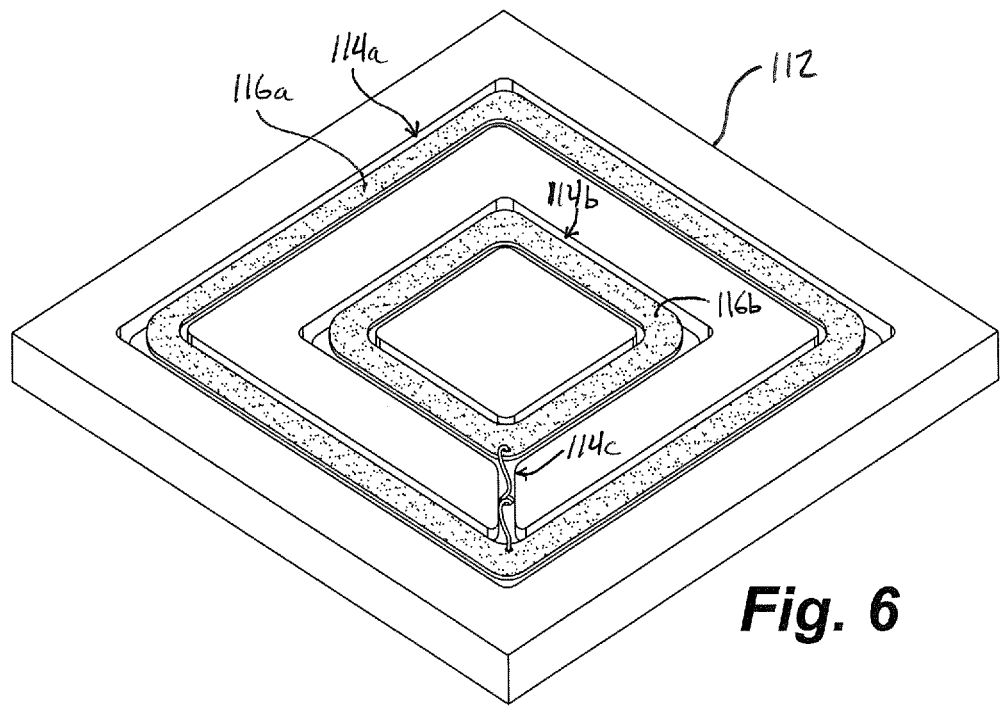
FIG. 6 is another perspective view of the substrate panel of FIG. 5, shown with E-field resonators mounted in the recessed regions of the panel.
Figure 7:
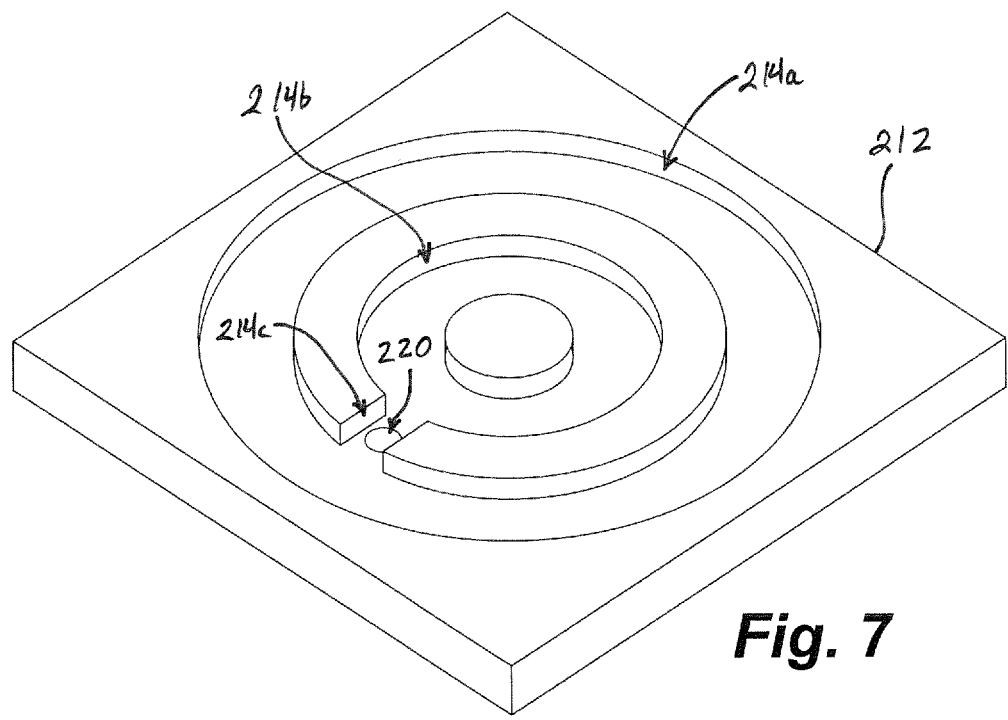
FIG. 7 is a perspective view of a substrate panel including two recessed regions in the shapes of concentric circles, for receiving surface-mounted resonators for wireless electrical power transmission.
Figure 8:
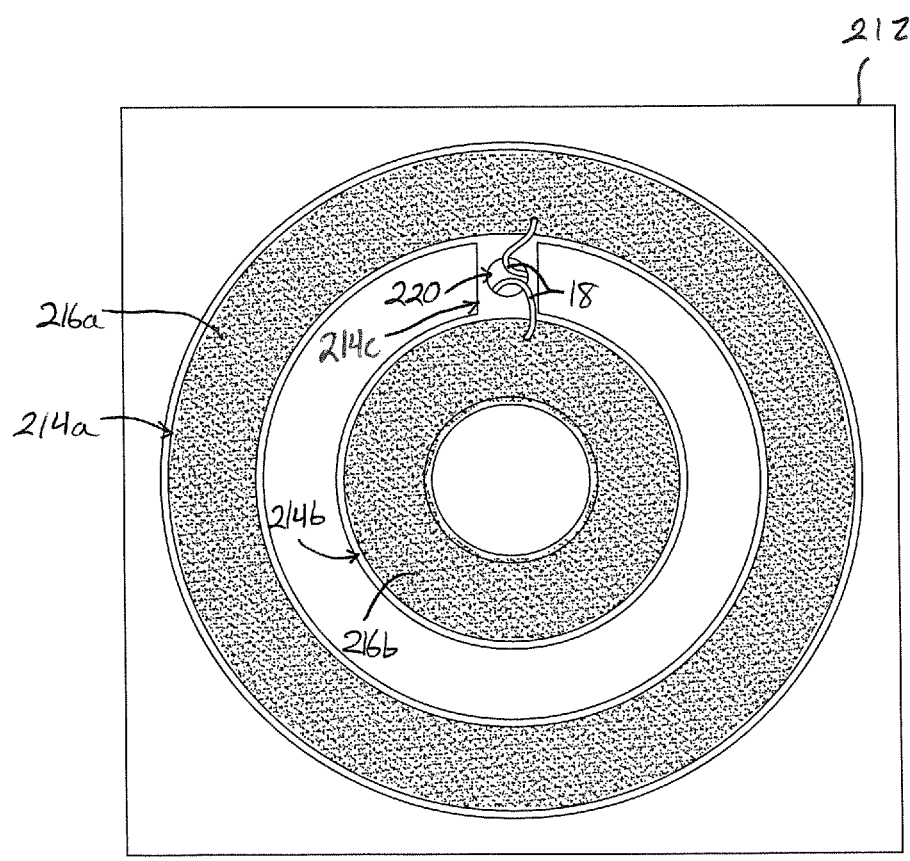
FIG. 8 is a top plan view of the substrate panel of FIG. 7, shown with E-field resonators mounted in the recessed regions of the panel.
Figure 9A:
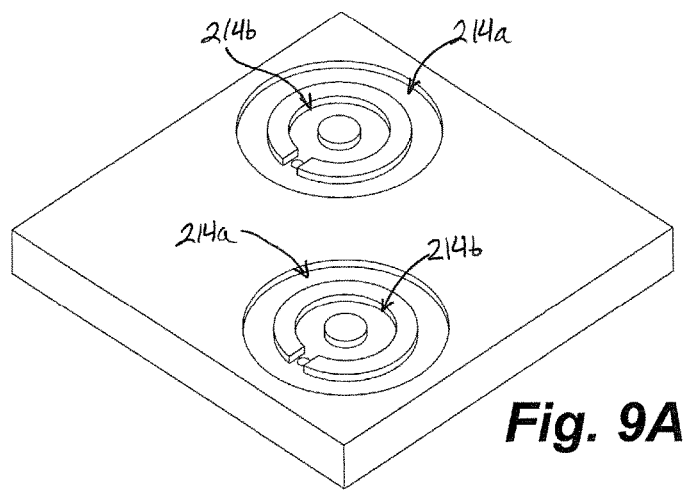
FIGS. 9A-9C are perspective views of other exemplary substrate panels with recessed regions for receiving surface-mounted resonators for wireless electrical power transmission.
Figure 9B:
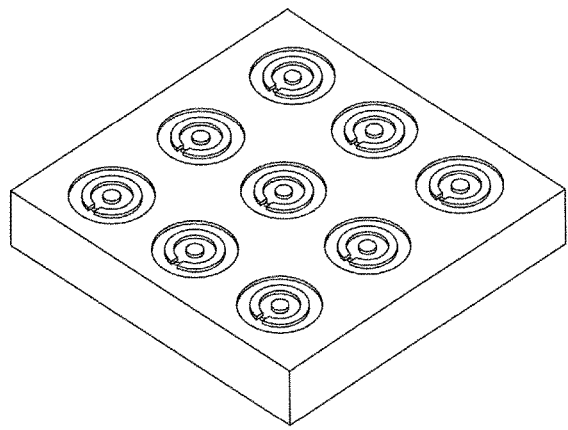
Figure 9C:
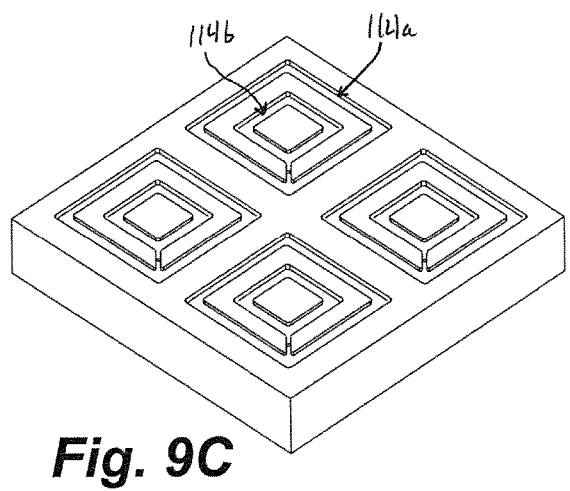

It will be appreciated that other shapes of recessed areas are envisioned without departing from the spirit and scope of the present invention, such as one or more square recessed areas (FIGS. 5, 6 and 9C), or one or more circular recessed areas (FIGS. 7-9B). In the embodiments of FIGS. 5, 6 and 9C, outer square recessed areas 114a surround inner square recessed areas 114b, with an intermediate recess or pass-through 114c formed between two adjacent corners, where a wire opening 120 is established. Similarly, in the embodiments of FIGS. 7-9B, outer circular recessed areas 214a surround inner circular recessed areas 214b, with an intermediate recess or pass-through 214c formed between the two areas where a wire opening 220 is established. Circular recessed areas 214a, 214b may be concentric as shown, and square recessed areas 114a, 114b may share a common center as shown, but it will be appreciated that the recessed areas may be shaped and positioned to accommodate different shapes of wireless power transmitters (including square wireless power transmitters 116a, 116b and circular wireless power transmitters 216a, 216b) and/or to concentrate wireless power transmission in desired areas of a given panel 12, 112, 212.

Optionally, and with further reference to FIG. 1, a power driver circuit 36 is positioned in the hollow chamber 34 and is in electrical communication with the wiring 18 and with an electrical power source (such as a high voltage AC power circuit of a building). Power driver circuit 36 is operable to receive high voltage AC power from the electrical power source and convert the high voltage AC power to a voltage and type that is suitable for use by the wireless power transmitter(s) 16. Suitable power driver circuits and wireless power transmitters are available, for example, from Solace Power Inc. of St. Johns, Newfoundland, Canada (www.solace.ca). Although the wireless electrical power transmission system is primarily described herein as being for electric field ('E-field') resonant capacitive coupling power transmission, it will be appreciated that the principles of the present invention may be practiced using inductive coils or other wireless power transmission technologies.

Referring once again to FIGS. 1 and 2, wireless electrical power transmission system 10 may further include one or more protective panels 28 configured for insertion into recessed area 14 above each wireless power transmitter 16. Protective panels 28 are preferably made of a non-ferrous material, such as non-ferrous metal, resinous plastic sheet material, molded resinous plastic, cardboard or MDF, wood or plywood, ceramic, a fiber-reinforced (e.g., Kevlar) resinous plastic, or the like, and are intended to resist damage to the wireless power transmitters 16, such as from abrasion or from impacts and point pressures caused by heavy furniture, rolling carts, dropped objects, etc. In the illustrated embodiment, protective panels 28 are sized and shaped for insertion into at least an upper region of recessed area 14. However, it will be appreciated that protective panels may be sized to cover a substantial portion of the first outer surface 22, or a substantial portion thereof. Optionally, protective panels 28 may be sufficiently thick so as to contact upper surfaces of wireless power transmitters 16 while being substantially flush with first outer surface 22. It is further envisioned that adhesives may be applied to protective panels 28 to aid in securing them in place, and also to secure an aesthetic cover 38, which may be a vinyl or synthetic tile, a carpet tile or carpet section, wood or composite wood product, concrete or ceramic or composite concrete panel or tile, gypsum board, or wallpaper, for example. It will be appreciated that the material and finished appearance of aesthetic cover 38 may be chosen according to application, e.g., floor, wall (including repositionable room dividers), ceiling, or work surface such as a desktop or tabletop.

Thus, the wireless electrical power transmission system of the present invention allows for wireless electrical power transmitters to be used in combination with ferrous metals while limiting or substantially preventing shielding or blocking the wireless transmission of electrical power by ferrous metals. Other components of the system, such as a power driver circuit, may be positioned remotely from the transmitters and connected via wiring that passes through the substrate or panel in which the wireless transmitters are mounted. The system may be incorporated into floor structures, including raised flooring systems, or into walls, ceilings, work surfaces, and the like, while presenting a desired aesthetic appearance and having minimal aesthetic impact in an area, or none at all, as desired. It will be appreciated that the term 'work surfaces' is not intended to be limiting, and such surfaces can range from tables or desks to countertops in homes or businesses, cabinets or cabinet shelves, fixed or portable shelves including book shelves, and the like.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A wireless electrical power transmission system comprising:
   a panel having a first outermost surface and a second outermost surface opposite said first outermost surface, with a panel thickness comprising solid structural substrate defined between said first and second outermost surfaces;
   a recessed area formed in said first outermost surface, wherein said recessed area has a depth that is less than said panel thickness;
   a wire opening extending through said panel, from said second outermost surface to said recessed area;
   a wireless power transmitter positioned in said recessed area, wherein an outer peripheral shape of said wireless power transmitter corresponds to an outer peripheral shape of said recessed area; and
   electrical wiring coupled to said wireless power transmitter and passing through said wire opening and exiting said panel through said second outermost surface, wherein said electrical wiring is in communication with an electrical power source.

2. The wireless electrical power transmission system of claim 1, wherein said panel comprises a ferrous material.

3. The wireless electrical power transmission system of claim 1, wherein said panel comprises a ceramic or composite concrete material.

4. The wireless electrical power transmission system of claim 1, wherein said recessed area is circular, square, or rectangular in shape.

5. The wireless electrical power transmission system of claim 4, wherein said recessed area comprises at least two concentric circles or at least two squares having a common center.

6. The wireless electrical power transmission system of claim 5, wherein said recessed area comprises a recessed pass-through disposed between said at least two concentric circles or between said at least two squares.

7. The wireless electrical power transmission system of claim 1, wherein said panel comprises a structural floor panel of a raised floor system.

8. The wireless electrical power transmission system of claim 7, wherein said panel is supported by a structural framework that cooperates with said panel to define a hollow chamber below said panel.

9. The wireless electrical power transmission system of claim 8, further comprising a power driver circuit positioned in said hollow chamber and in electrical communication with said wiring and the electrical power source, wherein said power driver circuit is operable to receive high voltage AC power from the electrical power source and to convert the high voltage AC power to a voltage and type for use by said wireless power transmitter.

10. The wireless electrical power transmission system of claim 1, wherein said wireless power transmitter is an electric field transmitter configured to establish an electric field resonant capacitive coupling with an electric field receiver spaced from said first outermost surface.

11. The wireless electrical power transmission system of claim 1, wherein said wireless power transmitter has a transmitter thickness that is equal to or less than said depth of said recessed area.

12. The wireless electrical power transmission system of claim 1, further comprising an aesthetic cover positioned along said first outermost surface of said panel and said wireless power transmitter.

13. The wireless electrical power transmission system of claim 12, further comprising an adhesive layer for adhering said aesthetic cover to at least said first outermost surface of said panel.

14. The wireless electrical power transmission system of claim 12, wherein said aesthetic cover comprises at least one chosen from (i) a vinyl or synthetic tile, (ii) gypsum board, (iii) a wood or composite wood panel or tile, and (iv) a concrete or ceramic or composite concrete panel or tile.

15. The wireless electrical power transmission system of claim 1, wherein said panel comprises a floor panel, a wall or room divider panel, or a ceiling panel in a work area.

16. A wireless electrical power transmission system comprising:
   a flooring panel comprising ferrous metal and having a first outermost surface and a second outermost surface opposite said first outermost surface, with a panel thickness comprising solid structural substrate defined between the first and second outermost surfaces;

a recessed area formed in said first outermost surface, wherein said recessed area has a depth that is less than said panel thickness;

a wireless power transmitter positioned in said recessed area, wherein an outer peripheral shape of said wireless power transmitter corresponds to an outer peripheral shape of said recessed area;

electrical wiring coupled to said wireless power transmitter and passing through an opening formed in said flooring panel and extending through said second outermost surface of said flooring panel at said recessed area and exiting said flooring panel through said second outermost surface, wherein said electrical wiring is in communication with an electrical power source;

an aesthetic cover positioned along said first outermost surface of said flooring panel;

an adhesive layer for adhering said aesthetic cover to at least said first outermost surface of said flooring panel; and a protective sheet disposed between said wireless power transmitter and said aesthetic cover.

17. The wireless electrical power transmission system of claim 16, wherein said aesthetic cover comprises at least one chosen from (i) a vinyl or synthetic tile, (ii) a wood or composite wood panel or tile, and (iii) a concrete or ceramic or composite concrete panel or tile.

18. The wireless electrical power transmission system of claim 16, wherein said flooring panel comprises a structural floor panel of a raised floor system, said structural floor panel supported by a structural framework that cooperates with said panel to define a hollow chamber below said panel, and further comprising an electrical circuit disposed in said hollow chamber, wherein said electrical wiring is in electrical communication with said electrical power source via said electrical circuit.

* * * * *